(12) United States Patent
Ramsay et al.

(10) Patent No.: US 10,346,328 B2
(45) Date of Patent: Jul. 9, 2019

(54) METHOD AND APPARATUS FOR INDICATING INTERRUPTS

(71) Applicant: Apple Inc., Cupertino, CA (US)

(72) Inventors: James D. Ramsay, San Jose, CA (US); Inder Sodhi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/700,838

(22) Filed: Sep. 11, 2017

(65) Prior Publication Data

US 2019/0079884 A1    Mar. 14, 2019

(51) Int. Cl.
*G06F 13/24* (2006.01)
*G06F 13/22* (2006.01)
*G06F 13/42* (2006.01)
*G06F 13/16* (2006.01)

(52) U.S. Cl.
CPC .......... *G06F 13/24* (2013.01); *G06F 13/1642* (2013.01); *G06F 13/22* (2013.01); *G06F 13/4282* (2013.01)

(58) Field of Classification Search
CPC ...... G06F 13/24; G06F 13/1642; G06F 13/22; G06F 13/4282
See application file for complete search history.

(56) References Cited

U.S. PATENT DOCUMENTS

| 5,564,060 A | * | 10/1996 | Mahalingaiah | G06F 13/26 710/260 |
| 7,861,024 B2 | * | 12/2010 | White | G06F 1/3203 710/260 |
| 7,870,320 B1 | * | 1/2011 | Purdham | G06F 3/0626 710/269 |
| 8,234,432 B2 | | 7/2012 | Serebrin | |
| 9,009,377 B2 | * | 4/2015 | Machnicki | G06F 13/24 710/261 |
| 2009/0248931 A1 | * | 10/2009 | Kato | G06F 13/24 710/109 |

* cited by examiner

*Primary Examiner* — Henry Tsai
*Assistant Examiner* — John B Roche
(74) *Attorney, Agent, or Firm* — Meyertons, Hood, Kivlin, Kowert & Goetzel, P.C.; Erik A. Heter

(57) ABSTRACT

An interrupt mechanism is disclosed. In one embodiment an integrated circuit (IC) is coupled to a number of peripheral devices, via a bus, and includes an interface controller. The interface controller includes a bus engine circuit coupled to receive data from the various ones of the peripheral devices, wherein the data may include various requests. The bus engine circuit also includes decoding circuitry configured to decode the data to determine the nature of the requests. Responsive to determining that interrupt information is stored in one or more of the requests, the interrupt information may be written to one of a number of interrupt registers. An interrupt controller may read the interrupt registers to determine the presence of interrupts, and thus initiate the process to see that they are serviced.

20 Claims, 5 Drawing Sheets

METHOD AND APPARATUS FOR INDICATING INTERRUPTS

BACKGROUND

Technical Field

This disclosure is directed to peripheral buses, and more particularly, to the handling of interrupt requests by devices coupled to a peripheral bus.

Description of the Related Art

Modern computer systems and devices typically include a number of peripheral devices coupled to an integrated circuit (IC), which in turn may implement one or more processor cores. Often times, these various peripheral devices may require servicing from functional circuitry on the IC (e.g., one of the processor cores). In order to obtain such servicing, the peripheral devices may assert interrupts. Additionally, in some systems, software may initiate interrupts.

Interrupts may be performed for various reasons. Such reasons include power management, a request for data, and so forth. Generally speaking, an interrupt may be asserted for any condition that requires immediate attention and cannot be handled by the asserting peripheral device.

With regard to the peripheral devices, circuitry on the IC may perform polling to determine the presence of interrupts that may have been asserted. In performing polling, circuitry on the IC may actively query the peripheral devices via a bus coupled thereto. Upon determining the presence of the interrupt through polling, servicing of the interrupt may be performed. Since the assertion of interrupts may occur asynchronously, polling for interrupts may be performed at frequent intervals.

SUMMARY

An interrupt mechanism is disclosed. In one embodiment an integrated circuit (IC) is coupled to a number of peripheral devices, via a bus, and includes an interface controller. The interface controller includes a bus engine, which is a bus interface circuit coupled to receive data from the various ones of the peripheral devices, wherein the data may include various requests. The bus engine circuit also includes decoding circuitry configured to decode the data to determine the nature of the requests. Responsive to determining that interrupt information is stored in one or more of the requests, the interrupt information may be written to one of a number of interrupt registers. An interrupt controller may read the interrupt registers to determine the presence of interrupts, and thus initiate the process to see that they are serviced.

In one embodiment, the interrupt controller may include interrupt handler circuitry to service the interrupts. Embodiments are also possible and contemplated wherein an interrupt may be handed off to another agent, e.g., from the interrupt handler to a processor core. In some embodiments, the interrupt registers may be implemented in banks, including a physical bank and virtual banks based on agents that are enabled to view interrupts in the physical bank. In such embodiments, particular interrupts may be assigned to various agents.

The method and apparatus embodiments described herein may allow the mapping of a number of interrupts into the data conveyed to the bus engine. Furthermore, by sending interrupts within data to the bus engine, the need for polling the different peripheral devices is eliminated.

BRIEF DESCRIPTION OF THE DRAWINGS

The following detailed description makes reference to the accompanying drawings, which are now briefly described.

Figure 1:
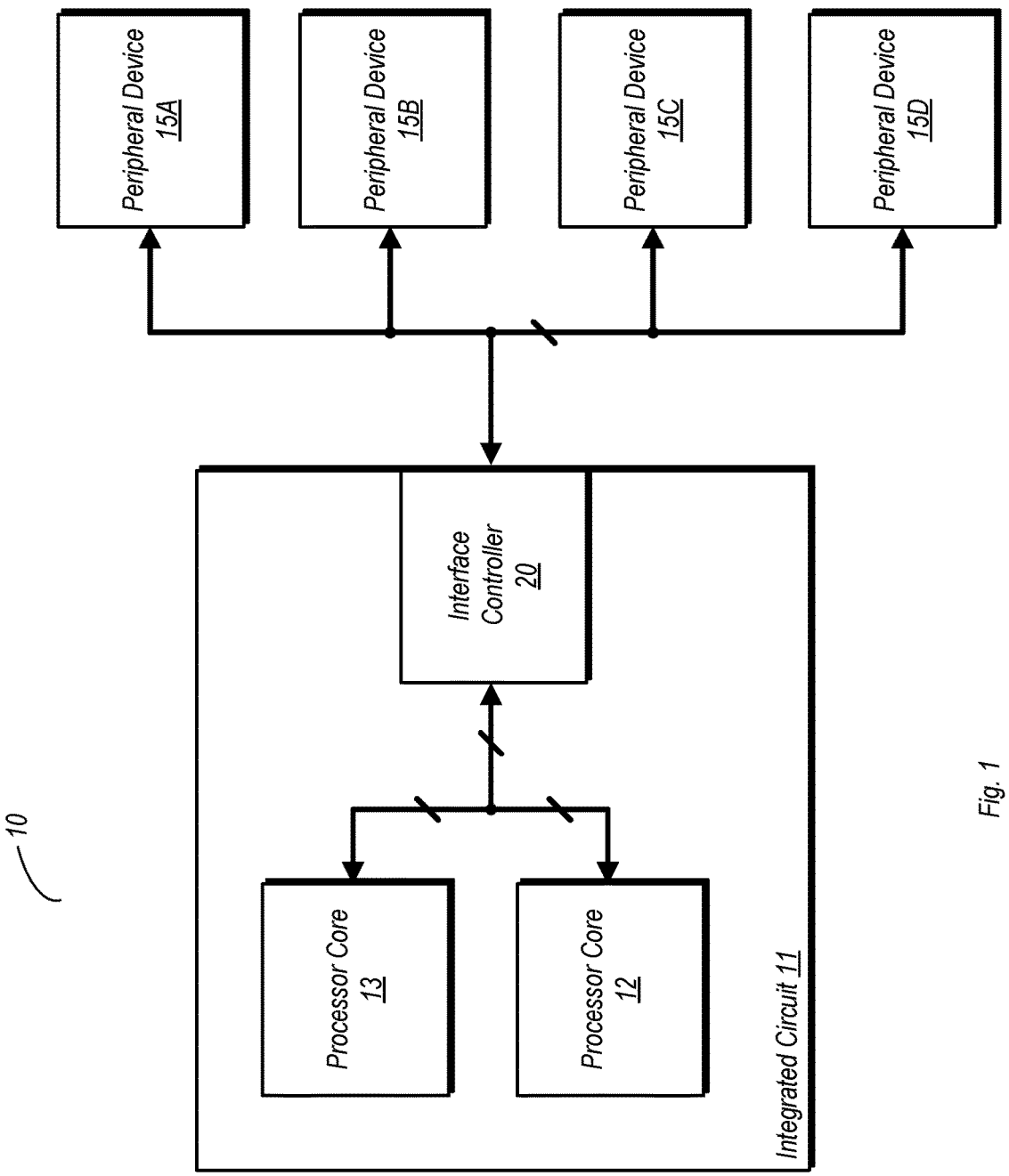
FIG. 1 is a block diagram of one embodiment of a system including an integrated circuit (IC) and a number of peripheral devices coupled thereto.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

FIG. 1 is a block diagram of one embodiment of a system including an integrated circuit (IC) and a number of peripheral devices coupled thereto. It is noted that the embodiment shown here is simplified for the sake of illustration, but is not intended to be limiting. For example, the number of peripheral devices shown here may be of a greater or lesser number that illustrated here. Any of the peripheral devices may perform functions that includes ones not explicitly discussed herein. Similarly, the number and types of functional circuit blocks of IC 11 may vary from what is explicitly illustrated here. It is further noted that the peripheral devices shown here, connected to IC via bus 11, may not be the only peripheral devices in various embodiments of system 10. Thus, embodiments are possible and contemplated in which other peripheral devices coupled by other buses System 10 in the embodiment shown includes IC 11, which is coupled to peripheral devices 15A-15D. The peripheral devices 15A-15D may each be one of a wide variety of peripheral devices. For example, one of peripheral devices 15A-15D may be a radio unit that includes circuitry for transmitting and receiving radio signals, as well as other functions such as up conversion, down conversion, data formatting and so on. Similarly, another one of the peripheral devices 15A-15D may perform various power management functions. In yet another example, one of peripheral devices 15A-15D may be a display controller configured to perform various functions for displaying data and graphics on a display screen. These are only a few of many possible examples of peripheral devices that may be coupled to IC 11.

Each of peripheral devices 15A-15D is coupled to IC 11 by a bus 18. In the embodiment shown, bus 18 is a shared bus. The bus may be a serial bus in one embodiment, although embodiments in which bus 18 is a parallel bus are also possible and contemplated. Data transfers between IC 11 and the peripheral devices 15A-15D may be conducted over bus 18, which in some embodiments may be a Serial Power Management Interface (SPMI) bus. SPMI bus 18 may be utilized in communications involving certain power management functions.

The processor cores are coupled to IC 11 at interface controller 20, which may provide a number of different functions, some of which are discussed below. Interface controller 20 in this embodiment is coupled to two different processor cores, processor cores 12 and 13. These processor cores may, in one embodiment, be different types of processor cores, e.g., one may be a high performance processor core while the other may be a high efficiency processor core. In another embodiment, these two processor cores may be of the same type. While shown as being directly connected to interface control 20 in this particular example, other connection mechanisms are possible and contemplated. For example, a switch fabric in which a number of functional circuit blocks are coupled to one another via dedicated point to point connections may be implemented in one embodiment. Embodiments implementing one or more crossbar switches are also possible and contemplated.

Although not explicitly shown here, other functional circuit blocks may also be included in IC 11. For example, functional circuit blocks such as a graphics controller, a cache subsystem that is shared by the various processor cores, memory controller circuits, one or more service processors, and so forth, may be implemented on IC 11. In one embodiment, IC 11 may implement a system-on-a-chip (SoC), and may thus include a large number and variety of functional circuit blocks.

Figure 2:
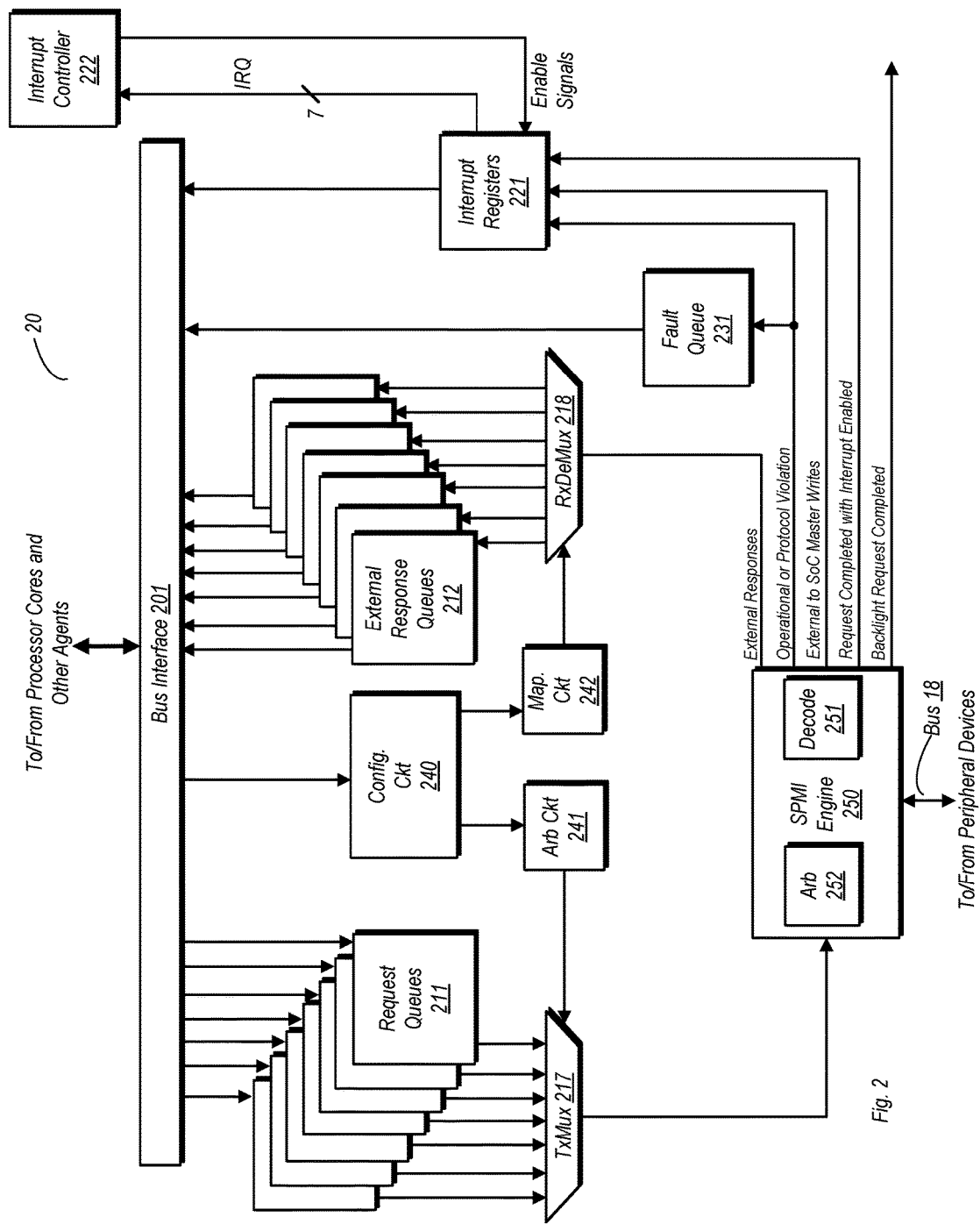
FIG. 2 is a block diagram illustrating one portion of an interface controller for one embodiment.

FIG. 2 is a block diagram illustrating one portion of an interface controller for one embodiment of IC 10. In the embodiment shown, the processor cores (as shown in FIG. 1) are coupled to a bus interface 201. The portion of interface controller 20 shown here may conduct various types of communications through bus interface 201, including those that will be explicitly discussed herein. Bus 18 in the embodiment shown is coupled to a bus interface circuit, SPMI engine 250, as bus 18 is an SPMI bus in this particular implementation. More generally, embodiments are possible and contemplated in which a bus interface engine of any type may be implemented in place of SPMI engine 250, with a corresponding bus coupled thereto. Such embodiments are consider to fall within the scope of this disclosure.

The various peripheral devices may submits requests, via bus 18, to SPMI engine 250. The requests may be submitted in various formats. For example, in one embodiment a request may be sent in the form of a code having a certain number of bits indicating the nature of the request. SPMI engine 250 may include decoding circuitry 251 that may read the code to determine the type of request. Additionally, SPMI engine 250 may also include arbitration circuitry 252 configured to arbitrate between multiple requests when present. The arbitration scheme used may vary among different embodiments, and relative priority of requests may be considered when arbitrating.

SPMI engine 250 may output decoded requests to various destinations. Requests that require agents within IC 10 to provide an external response (e.g., respond to an agent external to IC 10) may be output on the path labeled 'External Responses', to a demultiplexer, particularly RxDe-Mux 218. A mapping circuit 242 may select one of external response queues 212 to which the request may be routed. The mapping circuit 242 may operate based on configuration information received from configuration circuit 242. In one embodiment, mapping circuit 242 may route the request for external response to one of the external response queues 212 in accordance with an agent responsible for handling the request.

If the information received by SPMI engine 250 indicates an operational or protocol violation, the decoded request may be routed to both fault queue 231 and interrupt registers 221. Fault queue 231 may log the operational or protocol violation. The interrupt registers 221 may store information indicative of the interrupt, which may be retrieved by a responsible agent for handling. The interrupt registers 221, as will be discussed below, may include a number of separate registers. In one embodiment, the interrupt registers may be implemented in a manner to appear as multiple banks of registers such that individual agents are enabled or disabled to see certain interrupts depending on the agent responsible for handling these interrupts. The interrupt registers 221 may include registers to store interrupt requests submitted by any of the peripheral devices capable of asserting interrupts. Additionally, some interrupt registers may store interrupt requests that are initiated by software, e.g., such as software executing on a processor core.

Information may be read from the interrupt registers by interrupt controller 222 via IRO lines as shown (of which there are seven in this particular embodiment). Interrupt controller 222 may include interrupt handling circuitry enabling it to service some interrupts. Furthermore, interrupt controller 222 may hand off responsibility for servicing some interrupts that are stored in a register in one of the banks of duplicate registers. For example, responsibility for servicing certain interrupts in one case may be assigned to processor core, or another agent not explicitly shown herein. Furthermore, interrupt controller 222 may enable certain agents to view particular interrupts stored in interrupt registers 221, while inhibiting other agents from viewing the same interrupts. For example, a particular interrupt may be assigned to be handled by processor core 12. Interrupt controller 222 may enable processor core 12 to see the interrupt as stored in interrupt registers 221, while inhibiting other agents (e.g., processor core 13) from seeing the interrupt. In the embodiment shown, interrupt controller 222 may control which agents may view which interrupts through enable signals provided to the interrupt registers 221. In other embodiments, interrupt controller 222 may provide signals to the agents themselves.

Interrupt controller 222 in the embodiment shown may be a part of interface controller 20. However, embodiments are possible and contemplated in which interrupt controller 222 is implemented separate from interface controller 20.

In addition to operational or protocol violations, SPMI engine 250 may, in the embodiment shown, output interrupt information for external to SoC master writes (e.g., a write from an external device to an agent on IC 10), as well as information for requests to be completed with interrupts enabled. Embodiments in which interrupts under other categories are output by a bus engine to various interrupt registers are also possible and contemplated.

In addition to the various outputs mentioned above, SPMI engine 250 in the embodiment shown may also output an indication that a backlight request (e.g., associated with a display) has been completed.

Interface controller 20 in the embodiment shown includes a bus interface 201 coupled to other agents/functional circuit blocks in IC 10, including processor cores 12 and 13. At least some of the communications between agents external to IC 10 (e.g., peripheral devices) and agents internal thereto may be conducted through bus interface 201. Requests requiring external responses may be conveyed from external response queues 212, through bus interface 201, to the appropriate agents within IC 10.

Bus interface 201 in the embodiment shown is also coupled to a number of request queues 211. Requests to external devices from agents within IC 10 may be routed through bus interface 201 to the request queues 211. Furthermore, responses by internal agents to requests submitted from external agents may also be routed through bus interface 201 to request queues 211. A multiplexer, TxMux 217, may select a queue to route information from request queues 211 to SPMI engine 250 based on selection signals provided by arbitration circuit 241. The arbitration performed by arbitration circuit 241 may use any suitable methodology of arbitration, and may consider the priority of information stored in various ones of the request queues. The methodology (or methodologies) of arbitration utilized by arbitration circuit 241 may be based at least in part on configuration information provided by configuration circuit 240. The selected input of TxMux 217 may be routed through the multiplexer's output, to SPMI engine 250. From there, SPMI engine 250 may convey the information onto bus 18 and thus to its intended destination.

The ability for peripheral devices to submit interrupt requests via the apparatus illustrated in FIG. 2 may enable faster and more efficient handling of interrupts. In prior art embodiments, the presence of interrupt requests was determined by polling, e.g., by polling the peripheral devices. This polling would consume extra time, as another agent, e.g., an interrupt handler, would have to query each interrupt-capable device to determine the presence of interrupt requests. In various embodiments of the apparatus shown herein, the interrupts may be conveyed as requests to SPMI engine 250 and may subsequently be conveyed to the interrupt registers based on a relative priority. Thus, in lieu of a device having to wait until it is polled to convey an indication of an interrupt request, it may do so proactively in the various embodiments of the apparatus discussed herein.

Figure 3:
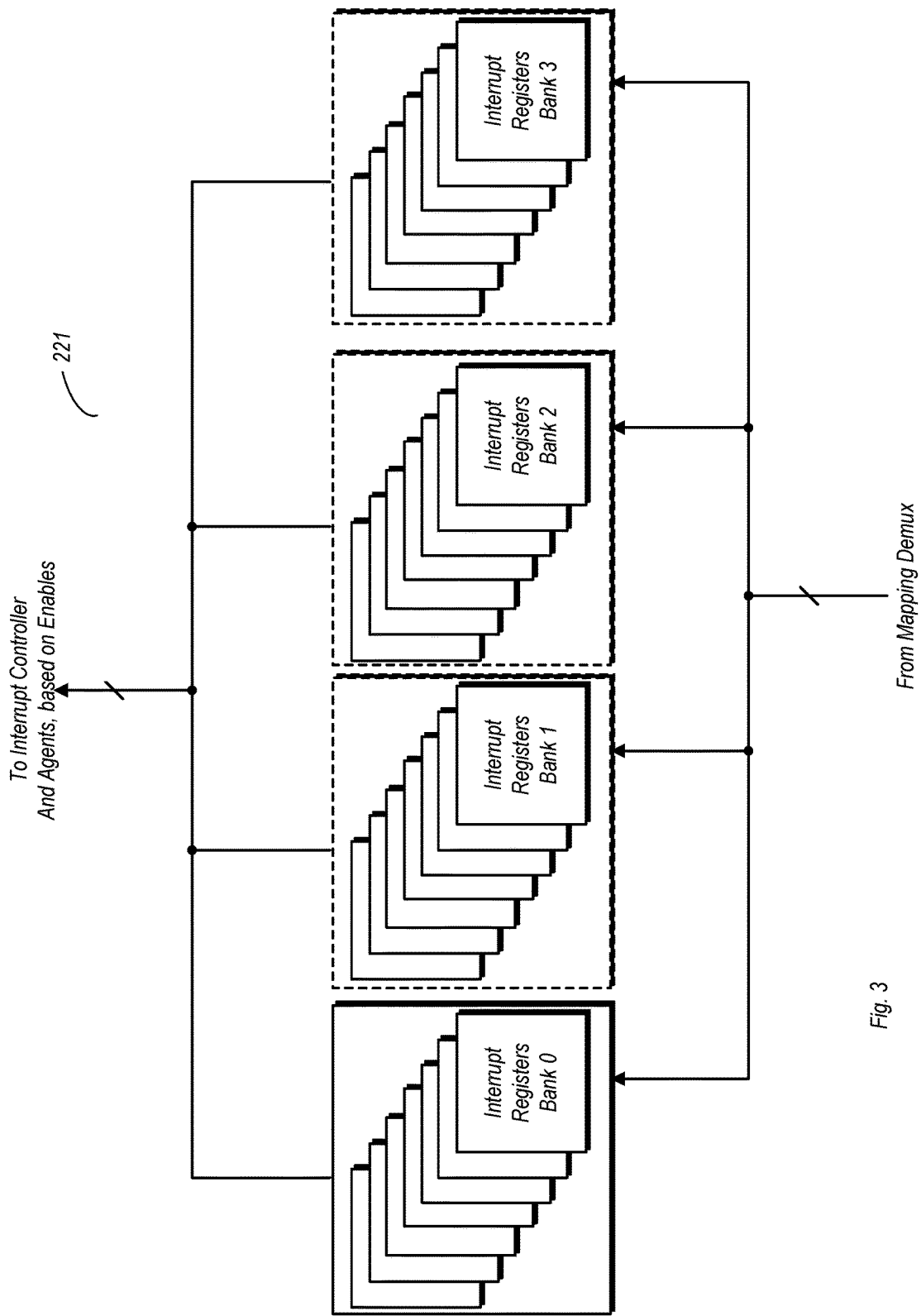
FIG. 3 is a block diagram illustrating interrupt registers implemented in a number of banks for one embodiment.

FIG. 3 is a block diagram illustrating interrupt registers implemented in a number of banks for one embodiment. In the embodiment shown, interrupt registers 221 are subdivided into four different banks, banks 0-3. The number of banks may vary from one embodiment to another. Furthermore, the number of registers in each of the banks may also vary from one embodiment to the next. As noted above, the banks of interrupt registers may be duplicates of one another in one embodiment.

It is noted that, in the embodiment shown, only the registers of Bank 0 are actual physical registers. The registers of Banks 1-3, in this embodiment may be considered views by various agents, hence the representation with dashed lines. An agent (e.g., a processor core) may have a view of interrupt stored in the physical registers if it is enabled to view them, or view a particular one of the physical interrupt registers. If a particular agent is not enabled to view the physical registers, or a particular one storing an interrupt, then as far as it is concerned there is no interrupt to be serviced. Thus, in the embodiment shown, the interrupt registers as shown here are implemented in one physical bank and multiple virtual banks, the virtual banks being based on which of the agents are allowed to view the physical registers (or portions thereof) at a given time).

The enabling of agents to view interrupt registers 221 may be accomplished in various ways. In one embodiment, a particular agent may be able to view the entirety of the physical interrupt registers (of Bank 0) at a given time. In another embodiment, agents may be enabled to selectively view particular ones of the interrupt registers, or particular bit positions within a given register. Generally speaking, the granularity of views of the physical interrupt registers may vary from one embodiment to the next, and may further vary within a given embodiment.

Figure 4:
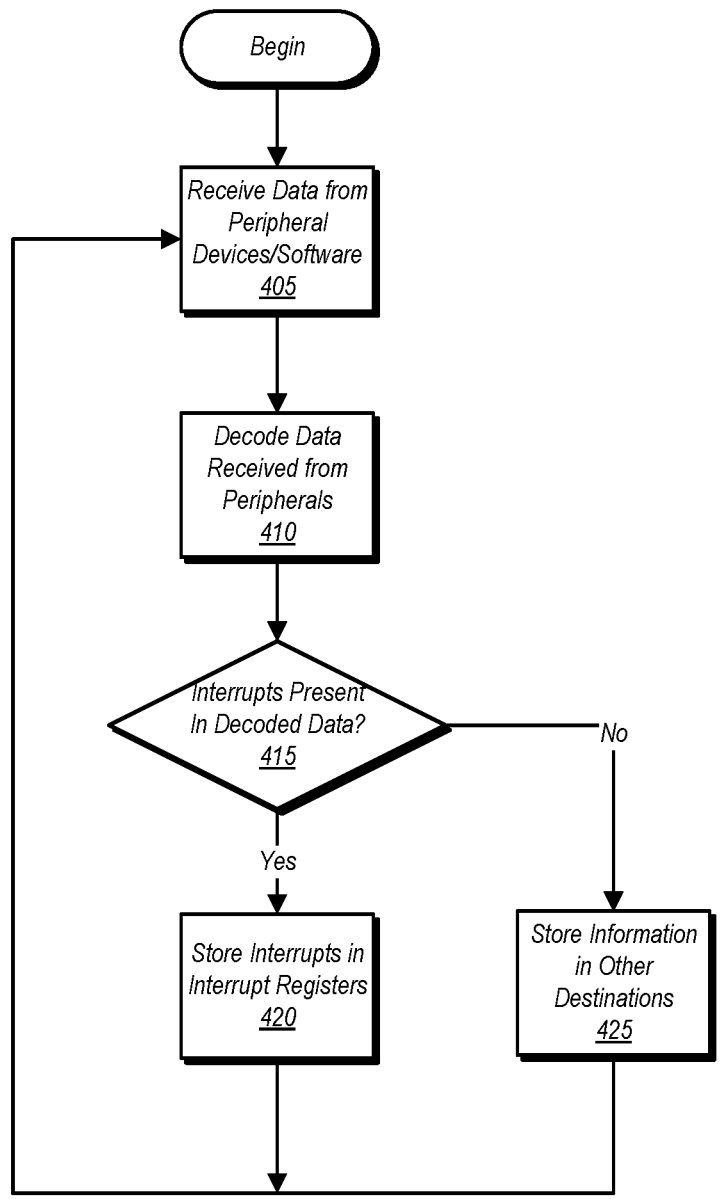
FIG. 4 is a flow diagram of one embodiment of a method for determining the presence of interrupts.

FIG. 4 is a flow diagram of one embodiment of a method for determining the presence of interrupts. Method 400 as shown herein may be performed by various embodiments of the apparatus discussed above. Furthermore, apparatus embodiments not explicitly discussed herein may also be capable of performing method 400, and thus may fall within the scope of this disclosure.

Method 400 begins with the receiving of data from peripheral devices and/or from software (block 405). The received data may be in the form of requests, which may be requests for data, general communications, interrupts, and so forth. The received data may be stored in request queues (block 410). Thereafter, the data stored in the request queues may be decoded (block 415). For example, using the embodiment of FIG. 2 above, a request stored in a request queue may be arbitrated and subsequently mapped to be received in an appropriate location.

If the decoding operation determines that interrupt request are present in decoded data (block 420, yes), the interrupt request information may then be stored in interrupt registers (block 425). Thereafter, the routing of interrupts to responsible agents and the servicing thereof may occur. If the decoded data does not include interrupts (block 420, no), it may be stored or forwarded to other destinations (block 430), as appropriate.

Figure 5:
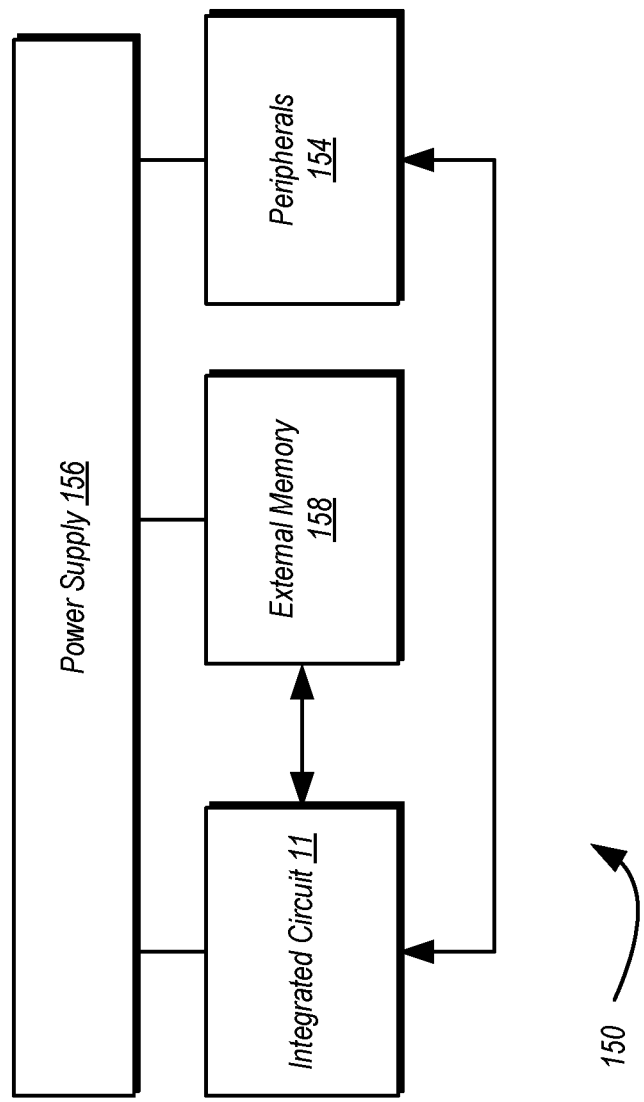
FIG. 5 is a block diagram of an exemplary system.

Turning next to FIG. 5, a block diagram of one embodiment of a system 150 is shown. In the illustrated embodiment, the system 150 includes at least one instance of an integrated circuit 10 coupled to external memory 158. The integrated circuit 10 may include a memory controller that is coupled to the external memory 158. The integrated circuit 10 is coupled to one or more peripherals 154 and the external memory 158. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as WiFi, Bluetooth, cellular, global positioning system, etc. The peripherals 154 may also include additional storage, including RAM storage, solid-state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, tablet, etc.).

The external memory 158 may include any type of memory. For example, the external memory 158 may be SRAM, dynamic RAM (DRAM) such as synchronous DRAM (SDRAM), double data rate (DDR, DDR2, DDR3, LPDDR1, LPDDR2, etc.) SDRAM, RAMBUS DRAM, etc. The external memory 158 may include one or more memory modules to which the memory devices are mounted, such as single inline memory modules (SIMMs), dual inline memory modules (DIMMs), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   an integrated circuit (IC) having an interface controller, wherein the interface controller comprises:
      a first bus interface circuit coupled to receive data from one or more of a plurality of peripheral devices coupled to the IC via a peripheral bus, wherein the bus interface circuit includes decoding circuitry configured to decode data received by the bus interface circuit and, responsive to determining that the data includes interrupt information for one of the plurality of peripheral devices, write the interrupt information to corresponding ones of a plurality of interrupt registers; and
      an interrupt controller coupled to the plurality of interrupt registers and further coupled to a plurality of agents implemented in the IC, wherein the interrupt controller is configured to inhibit particular ones of the plurality of agents from viewing interrupt information stored in particular ones of the plurality of interrupt registers, wherein the plurality of interrupt registers is implemented as a bank of physical registers subdivided into a plurality of virtual banks based on which of the plurality of agents are allowed to view interrupt information in particular ones of the physical registers at a given time.

2. The apparatus as recited in claim 1, wherein the interrupt controller is configured to cause servicing of interrupts indicated by information stored in one of the plurality of interrupt registers.

3. The apparatus as recited in claim 2, wherein the interrupt controller is coupled to a plurality of agents in a system and is configured to hand off an interrupt indicated by interrupt information stored in one of the plurality of interrupt registers from one agent to another agent.

4. The apparatus as recited in claim 1, wherein the interface controller comprises the plurality of interrupt registers and further comprises a second bus interface circuit, the second bus interface circuit being coupled to the plurality of agents.

5. The apparatus as recited in claim 1, further comprising arbitration circuitry configured to arbitrate among requests stored in various ones of a plurality of request queues implemented in the interface controller.

6. The apparatus as recited in claim 5, further comprising mapping circuitry configured to map requests from one of the plurality of peripheral devices to one of a plurality of external response queues.

7. The apparatus as recited in claim 1, wherein the bus interface circuit is a system power management interface engine.

8. The apparatus as recited in claim 1, wherein at least one of the plurality of interrupt registers is configured to store information indicative of a software initiated interrupt.

9. A method comprising:
receiving data, in an interface controller of an integrated circuit (IC), from one or more of a plurality of peripheral devices coupled to the IC via a peripheral bus;
decoding, using decoding circuitry, the data received by the interface controller;
responsive to determining that data received by the interface controller includes interrupt information for one of the plurality of peripheral devices, writing the information to a corresponding one of a plurality of interrupt registers in the interface controller; and
an interrupt controller inhibiting particular ones of a plurality of agents from viewing interrupt information stored in particular ones of the plurality of interrupt registers, the plurality of interrupt registers being implemented as a bank of physical registers subdivided into a plurality of virtual banks based on which of the plurality of agents are allowed to view interrupt information in particular ones of the physical registers at a given time.

10. The method as recited in claim 9, further comprising:
interrupt controller determining presence of an interrupt request responsive to reading one or more of the plurality of interrupt registers; and
the interrupt controller causing servicing of the interrupt responsive to determining the presence of interrupt.

11. The method as recited in claim 10, further comprising the interrupt controller handing off an interrupt indicated by interrupt information stored in one of the plurality of interrupt registers from a first agent in a system that includes the interrupt controller to a second agent in the system.

12. The method as recited in claim 11, further comprising the second agent servicing the interrupt.

13. The method as recited in claim 9, further comprising arbitration circuitry arbitrating among requests received from the one or more of the plurality of peripheral devices.

14. The method as recited in claim 13, further comprising conveying requests that win arbitration to one of a plurality of intended destinations, wherein the plurality of intended destinations includes a plurality of external response queues, a fault queue, and the plurality of interrupt registers.

15. The method as recited in claim 9, wherein the interface controller includes a system power management interface (SPMI) engine, and wherein the method further comprises the SPMI engine receiving the data from the one or more of the plurality of peripheral devices.

16. The method as recited in claim 9, further comprising at least one of the plurality of interrupt registers storing information indicative of a software initiated interrupt.

17. A system comprising:
a plurality of peripheral devices coupled to a peripheral bus;
an integrated circuit (IC), the IC including an interface controller coupled to the plurality of peripheral devices via the peripheral bus, wherein the interface controller comprises:
a bus interface circuit coupled to receive data from one or more of a plurality of peripheral devices coupled to the IC via a peripheral bus, wherein the bus interface circuit includes decoding circuitry configured to decode data received by the bus interface circuit and, responsive to determining that the data includes interrupt information for one of the plurality of peripheral devices, write the interrupt information to corresponding ones of a plurality of interrupt registers; and
an interrupt controller configured to cause servicing of interrupts indicated by information stored in one of the plurality of interrupt registers, wherein the interrupt controller is coupled to a plurality of functional circuit blocks implemented in the IC and is further configured to inhibit particular ones of the plurality of functional circuit blocks from viewing interrupt information stored in particular ones of the plurality of interrupt registers, wherein the plurality of interrupt registers is implemented as a bank of physical registers subdivided into a plurality of virtual banks based on which of the plurality of agents are allowed to view interrupt information in particular ones of the physical registers at a given time.

18. The system as recited in claim 17, wherein the bus interface circuit includes:
arbitration circuitry configured to arbitrate among requests received from the one or more of the plurality of peripheral devices; and
wherein the bus interface circuit is configured to convey requests that win arbitration to one of a plurality of intended destinations, wherein the plurality of intended destinations includes a plurality of external response queues, a fault queue, and the plurality of interrupt registers.

19. The system as recited in claim 17, wherein the interrupt controller is configured to enable the registers of the physical bank to be accessible by one or more of a plurality of functional circuit blocks in the IC.

20. The system as recited in claim 17, wherein at least one of the plurality of interrupt registers is configured to store information indicative of a software initiated interrupt.

* * * * *